June 19, 1956      E. B. MILLER      2,751,033

FLUID TREATING APPARATUS

Filed Jan. 26, 1954      6 Sheets-Sheet 1

INVENTOR
ERNEST B. MILLER

BY

ATTORNEYS

June 19, 1956  E. B. MILLER  2,751,033
FLUID TREATING APPARATUS
Filed Jan. 26, 1954  6 Sheets-Sheet 2

FIG. 3.

INVENTOR
ERNEST B. MILLER

ATTORNEYS

INVENTOR
ERNEST B. MILLER

ATTORNEYS

June 19, 1956  E. B. MILLER  2,751,033
FLUID TREATING APPARATUS
Filed Jan. 26, 1954  6 Sheets-Sheet 4

INVENTOR
ERNEST B. MILLER
BY
ATTORNEYS

June 19, 1956 E. B. MILLER 2,751,033
FLUID TREATING APPARATUS
Filed Jan. 26, 1954 6 Sheets-Sheet 5

INVENTOR
ERNEST B. MILLER

BY

ATTORNEYS

June 19, 1956 E. B. MILLER 2,751,033
FLUID TREATING APPARATUS
Filed Jan. 26, 1954 6 Sheets-Sheet 6

FIG. 11.

INVENTOR
ERNEST B. MILLER

BY *Adam + Bush*
ATTORNEYS

United States Patent Office 2,751,033
Patented June 19, 1956

2,751,033

FLUID TREATING APPARATUS

Ernest B. Miller, Houston, Tex., assignor to Jefferson Lake Sulphur Company, New Orleans, La., a corporation of New Jersey Application January 26, 1954, Serial No. 406,310

6 Claims. (Cl. 183—4.6)

This invention relates to fluid treating apparatus of the type in which fluids, either liquid or gaseous, are brought into contact with the fluid treating material, either a reactant material to effect a chemical reaction, and/or an adsorbent material to adsorb liquid or gaseous products from the fluid being treated, and in which the treating material is stripped of its adsorbed products and/or is regenerated for further use. The present invention has more particular reference to fluid treating apparatus of the so-called continuous type.

One object of the present invention is to provide a novel and improved fluid treating apparatus providing for a plurality of separate, distinct and continuous flows of fluid therethrough and in which a plurality of closed vessels containing fluid treating material have one of their ends connected to communicate with a valve disc associated with a stationary member having a plurality of manifold compartments formed therein and the other of their ends connected to communicate with a valve disc associated with a second stationary member having a plurality of manifold compartments formed therein; and means for rotating said closed vessels and said valve discs so that the flows of fluids through the apparatus will be directed successively through each of the vessels containing fluid treating material.

Another object of the invention is to provide fluid treating apparatus, as characterized above, wherein the vessels containing the fluid treating material have readily accessible and removable cover plates through which the fluid treating material may readily be removed and replaced.

Another object of the invention is to provide fluid treating apparatus, as characterized above, where said vessels containing fluid treating material, said valve discs, and said stationary members are mounted within a pressure vessel so that all flows of fluid through said apparatus may be made under high pressure.

Another object of the invention is to provide a fluid treating apparatus, as characterized above, wherein said pressure vessel is provided with a hand hole opening to provide access to said closed vessels for removing and replacing the fluid treating material contained therein.

Another object of the invention is to provide a fluid treating apparatus, as characterized above, in which a large surface area of relatively thin beds of fluid treating material offering a minimum of resistance to the flow of the fluids is condensed into a small cubic space.

Another object of the invention is to provide fluid treating apparatus, as characterized above, in which baffle members are provided to insure an even flow of the fluid through the treating material, thereby making effective use of all of the treating material and increasing the efficiency and capacity of the apparatus.

A further and more specific object of the present invention is to provide an improved apparatus for removing moisture and condensable hydrocarbons from natural gas.

Other objects and advantages of the invention will appear in the specification when considered in connection with the accompanying drawings, in which.

Referring now to Figs. 1 to 10, inclusive, there is shown one embodiment of fluid treating apparatus constructed in accordance with the present invention. As there shown, the apparatus comprises an elongated upright cylindrical pressure vessel 20 having flanged vertically aligned circular openings 21, 22 in its top and bottom walls, respectively, closed by top and bottom flanged cover plates 23, 24 removably secured to cover said openings, as by bolting; suitable framework, indicated at 25, for supporting the vessel 20 in an upright position; a rotatable vertical shaft 26 extending through the pressure vessel 20 with its upper end journaled in a suitable cap bearing carried by the upper closure member 23 and with its lower end extending through a suitable shaft seal, secured to the bottom of the lower closure member 24; a vertical shaft 27 coupled to the bottom end of the shaft 26 and connected to suitable differential gearing indicated at 28, driven by a motor 29; a support disc 30 fixedly mounted on the shaft 26 for rotation therewith within said pressure vessel and providing support for a plurality of elongated fluid treating material containing cylindrical vessels 31; upper and lower distributive assemblages, indicated generally at 32, 33, each assemblage comprising an annular stationary member 34 having a plurality of compartments or manifolds formed therein, a tube sheet disc valve 35 slidably mounted on the shaft 26 for rotation therewith, a spring support disc 36 fixedly mounted on the shaft 26 and supporting a plurality of coiled springs 37 which engage the tube sheet disc valve 35 and tightly press it against the open end of the annular stationary member 34; a plurality of flexible pipes 38, each connecting the upper end portion of one of the vessels 31 and the tube sheet disc valve 35 of the upper distributive assemblage; a plurality of flexible pipes 39, each connecting the lower end portion of one of the vessels 31 and the tube sheet disc valve 35 of the lower distributive assemblage; a plurality of inlet-outlet conduits, four such being shown, 40, 41, 42 and 43, connected to the annular stationary member 34 of the upper distributive assemblage and extending upwardly through the upper cap closure member 23, for the ingress and egress of fluids to and from the upper stationary member 34; and a plurality of inlet-outlet conduits, four such being shown, 44, 45, 46 and 47, connected to the annular stationary member 34 of the lower distributive assemblage, and extending downwardly through the lower cap closure member 24, for the ingress and egress of fluids to and from the lower stationary member 34.

The cylindrical pressure vessel 20 and the cap cover members 23, 24 are preferably made of heavy boiler plate. The flanges formed on the peripheries of the openings 21, 22 of the vessel 20 and the peripheries of the cap cover members 23, 24 are preferably formed of heavy iron rings, rectangular in cross section and are welded to the peripheral edges of the openings and the cover plates.

The shafting 26, preferably, and as shown, is formed of three sections, an upper section 48, an intermediate section 49, and a lower or bottom section 50. The upper and lower sections 48 and 50 consist of solid rod, round in cross section. The intermediate section 49 consists of a hollow pipe having an internal diameter considerably larger than the diameters of the upper and lower sections.

The upper section 48 has its upper end journaled in a suitable cap bearing 51 carried by the upper cover member 23 and its lower end supported in a support bushing 52 mounted in the upper end of the intermediate section 49 with a pin 53 passing through the two sections and the bushing for rigidly and detachably securing the two sections together.

The bottom section 50 has its upper end engaged in a support bushing 54 mounted in the lower end of the intermediate section 49 with a pin 55 passing through the two sections and the bushing for rigidly and detachably securing the two sections together, and with its lower end extending through the lower cover member 24 and a suitable shaft seal 56 and coupled to the upper end of the shaft 27.

The support disc 30 which supports the cylindrical vessels 31 is composed of two semi-annular flat pieces 57, the inner adjacent straight edges of which are provided with flanges which are bolted together to form the complete disc. This is to permit of assembling the disc within the pressure vessel 20.

The disc 30 (see Figs. 3 and 6) is fixedly secured, as by bolting, to a collar 58 fixedly secured to the intermediate section 49 of the shaft 26, so that the disc will rotate with the shaft. The outer peripheral edge portion of the disc 30 is supported by means of a plurality of supporting links or arms 59, each having its upper end bolted to one of a plurality of circumferentially spaced lugs 60 carried by a collar 61 fixedly secured to the intermediate section 49 of the shaft 26 and its lower end bolted to one of a plurality of circumferentially spaced upstanding lugs 62 secured to the upper surface of the disc 30.

Figure 3:
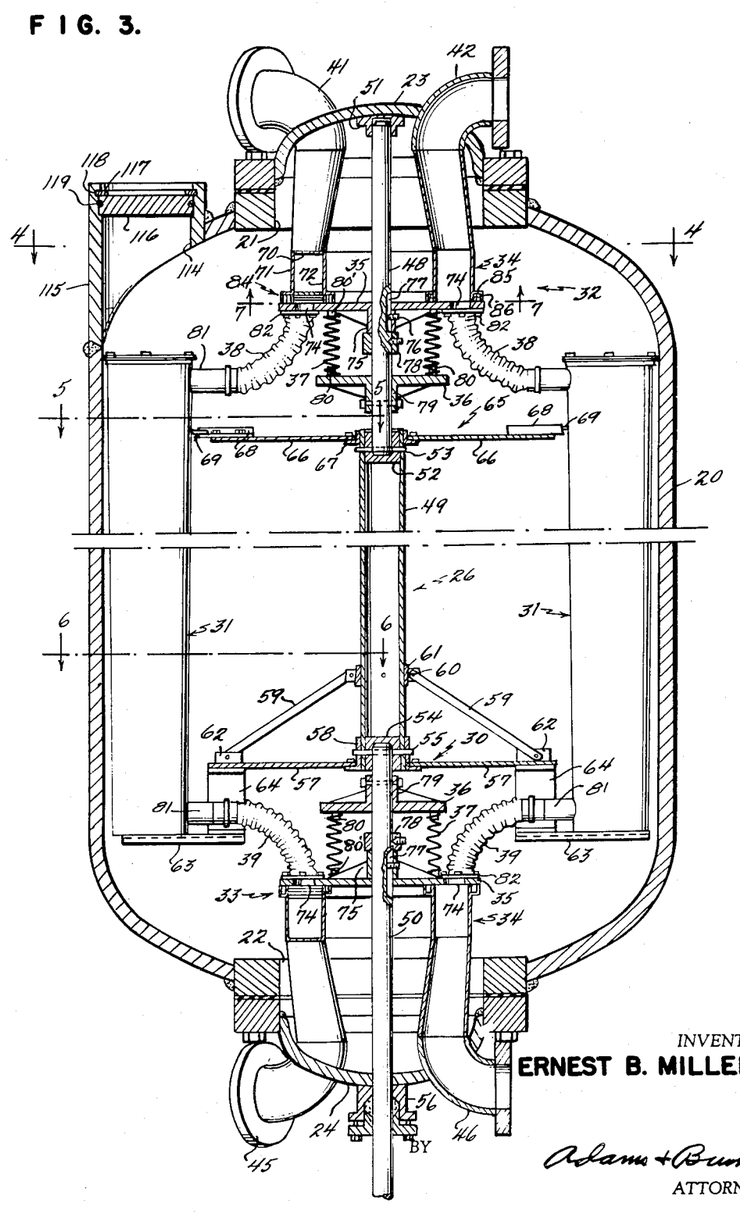
Fig. 3 is a vertical sectional view taken on the line 3—3 of Fig. 2, but omitting the driving apparatus.
Figure 4:
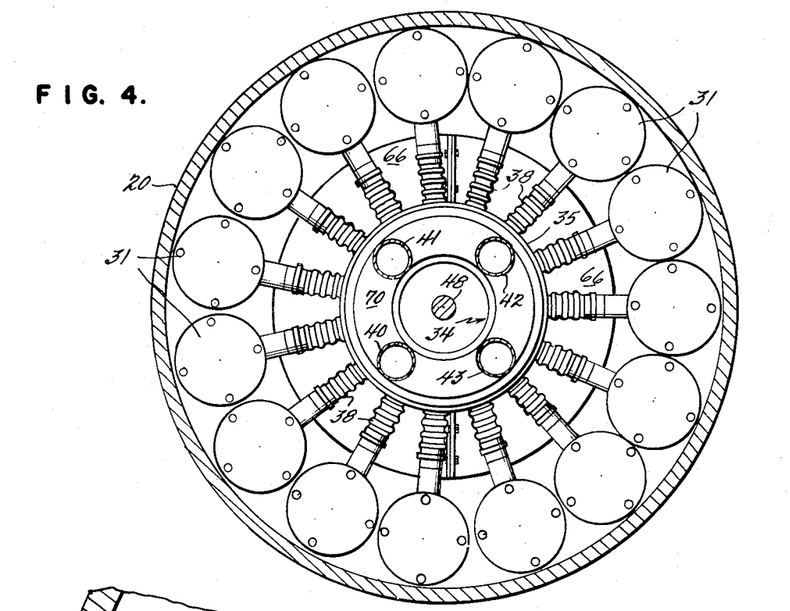
Fig. 4 is a horizontal sectional view taken on the line 4—4 of Fig. 3.
Figure 5:
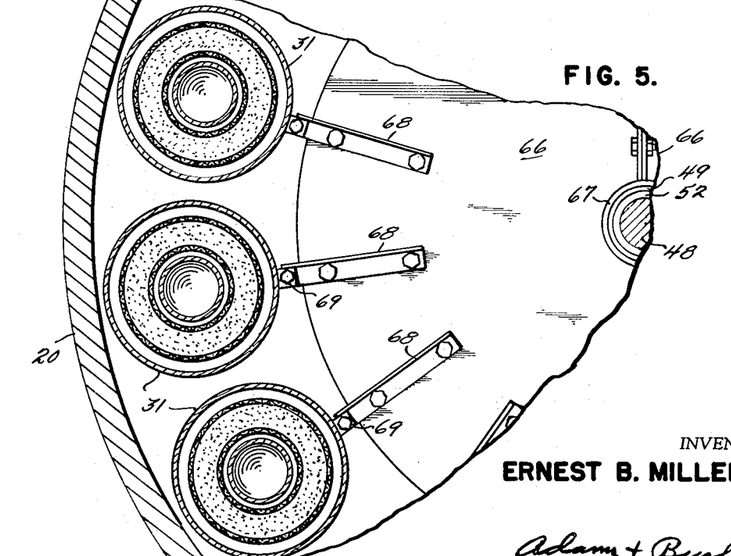
Fig. 5 is a fragmentary sectional view taken on the line 5—5 of Fig. 3, showing the manner of bracing the upper ends of the elongated fluid treating material containing vessels.
Figure 6:
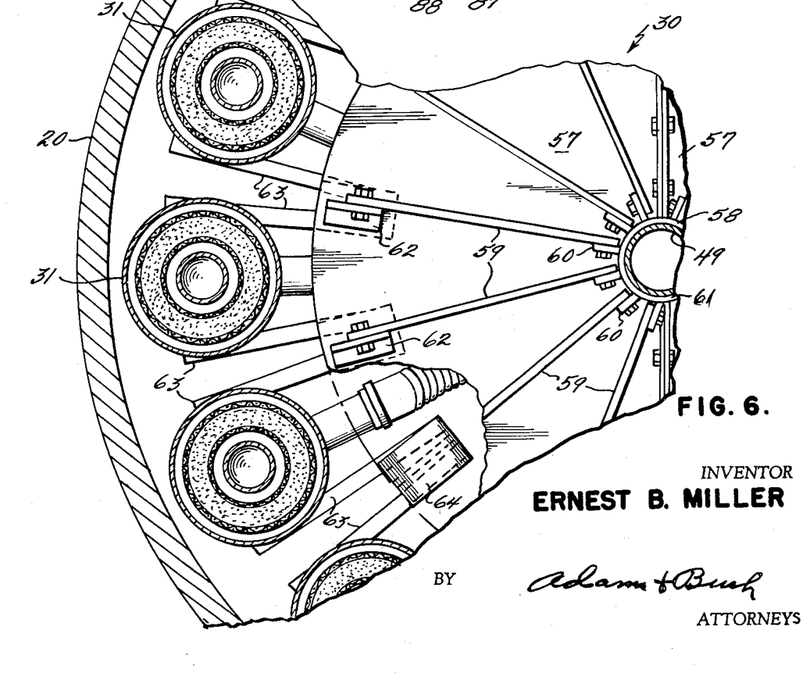
Fig. 6 is a fragmentary sectional view taken on the line 6—6 of Fig. 3, showing the manner of supporting the lower ends of the elongated fluid treating material containing vessels.

The vessels 31 are supported by the disc 30, as by means of a plurality of supporting links or arms 63, in the form of short sections of structural angles, each arm 63 having its outer end portion fixedly secured to the bottom and one side of one of said vessels 31, as by welding, and its inner end portion fixedly secured, as by bolting, to one of a plurality of circumferentially spaced dependent lugs 64, in the form of short section of I-beams, welded to the under surface of the disc 30 (see Figs. 3 and 6).

Means may be provided for holding the cylindrical vessels 31 in their upright position encircling the shaft 26. In the particular embodiment of the invention illustrated, such means are shown as comprising a disc 65 composed of two semi-annular flat pieces 66, 66, the inner adjacent straight edges of which are provided with flanges which are bolted together to form the complete disc. This is to permit of assembling the disc within the pressure vessel 20. The disc 65 (see Figs. 3 and 5) is fixedly secured, as by bolting, to a collar 67 fixedly secured to the intermediate section 49 of the shaft 26, so that the disc will rotate with the shaft. The upper end portions of the vessels 31 are held in their upright position by the disc 65, as by means of a plurality of bracing strips or arms 68 in the form of short sections of structural angles. Each arm 68 has its outer end bolted to a lug 69 welded on the outer surface of one of the vessels 31 and its inner end portion fixedly secured, as by bolting, to the upper surface of the disc 65.

The upper and lower distributive assemblages 32, 33 are identical in construction and, as shown in Fig. 3, each comprises an annular trough-shaped stationary member 34 having a plurality of compartments or manifolds formed therein; a tube sheet disc valve 35 slidably mounted on the shaft 26 for rotation therewith; and a spring support disc 36 fixedly mounted on the shaft 26 and supporting a plurality of coiled springs 37 which engage the tube sheet disc valve 35 and tightly press it against the open end of the annular stationary member 34.

Figures 7, 8:
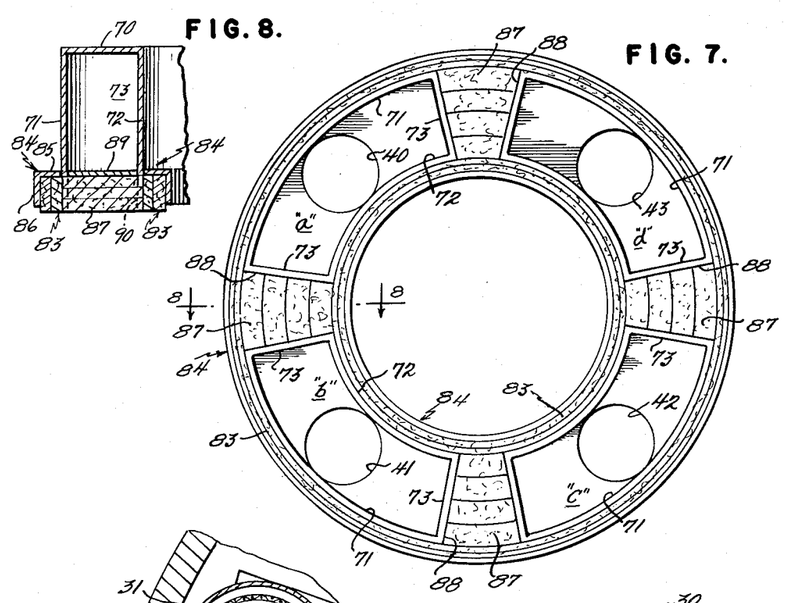
Fig. 7 is a horizontal sectional view taken on the line 7—7 of Fig. 3.
Fig. 8 is a detail sectional view on line 8—8 of Fig. 7.

The upper and lower annular stationary members 34 are identical in construction and, as shown in Figs. 3, 4, 7 and 8, each is formed in the shape of an annular trough having an annular top (or bottom) wall 70 and annular side walls 71, 72 (see Figs. 3 and 8).

The member 34 is divided into a plurality of compartments or manifolds, as by means of a plurality of circumferentially spaced pairs of wall members 73 extending transversely of the member 34 and having their top (or bottom) and side walls welded to the top (bottom) and side walls of the member 34 to form gas-tight joints. Four such compartments or manifolds are shown and, for the purposes of clarity of description, designated manifolds "a," "b," "c" and "d," respectively.

The upper member 34 of the upper distributive assemblage 32 is held stationary relative to the rotation of the shaft 26 and the upper tube sheet disc valve 35 by the upper inlet-outlet conduits 40, 41, 42 and 43, which are welded to the upper cap closure member 23 and have their lower ends connected, as by welding, to the manifolds "a," "b," "c" and "d," respectively, in the upper member 34 to provide communication therewith.

The lower member 34 of the lower distributive assemblage is held stationary relative to the rotation of the shaft 26 and the lower tube sheet disc valve 35 by the lower inlet-outlet conduits 44, 45, 46 and 47, which are welded to the lower cap closure 24 and have their upper ends connected, as by welding, to the manifolds "a," "b," "c" and "d," respectively, in the lower member 34 to provide communication therewith.

The upper and lower tube sheet disc valves 35 are identical in construction and, as shown in Fig. 3, each comprises a flat metal disc having a plurality of circumferentially spaced circular openings 74 formed in a circular row adjacent its periphery. The disc is provided with a collar 75 having a plurality of radially extending reinforcing ribs welded to its bottom surface or cast integral therewith. The collar 75 is keyed on the upper (lower) section of the shaft 26 to have longitudinal movement therealong as well as rotative movement therewith, as by means of a set screw 76 slidably engaging in a longitudinal groove 77 formed in the upper (lower) section of the shaft 26. A second collar 78 is fixedly secured to the shaft 26 immediately beneath the collar 75 to limit the inward movement of the disc as it moves longitudinally of the shaft 26. The disc 35, as well as the collar 75, are loosely fitted on the shaft 26 so that the disc valve can be moved slightly to conform to any change in the plane of the engaged surface of the stationary member 34, due to unequal expansion and contraction.

The tube sheet disc 35 is so mounted on the shaft 26 that it slidably engages the open bottom (top) end of the annular stationary member 34 with the circular row of openings 74 vertically aligned with the manifolds "a," "b," "c" and "d," so that each manifold will be in communication with a group of the circular openings.

The upper and lower spring support discs 36 are identical in construction and, as shown in Fig. 3, each comprises a metal disc mounted on the shaft and having a hub 79 provided with a plurality of circumferentially spaced radial ribs or webs welded to the under face of the disc to strengthen it. The hub is fixedly secured to the shaft, as by a set screw. A plurality of vertically extending circumferentially spaced coiled springs 37 are interposed between the tube sheet disc valve 35 and the spring support disc 36. In order to insure that the springs 37 remain in proper position, they are mounted on and between short stubs 80 extending upwardly from the disc 36 and short corresponding stubs 80' extending downwardly from the disc 35. The construction and arrangement is such that the springs 37 will keep the disc valve 35 evenly and firmly pressed into engagement with the under surface of the annular stationary member 34.

Figures 9, 10:
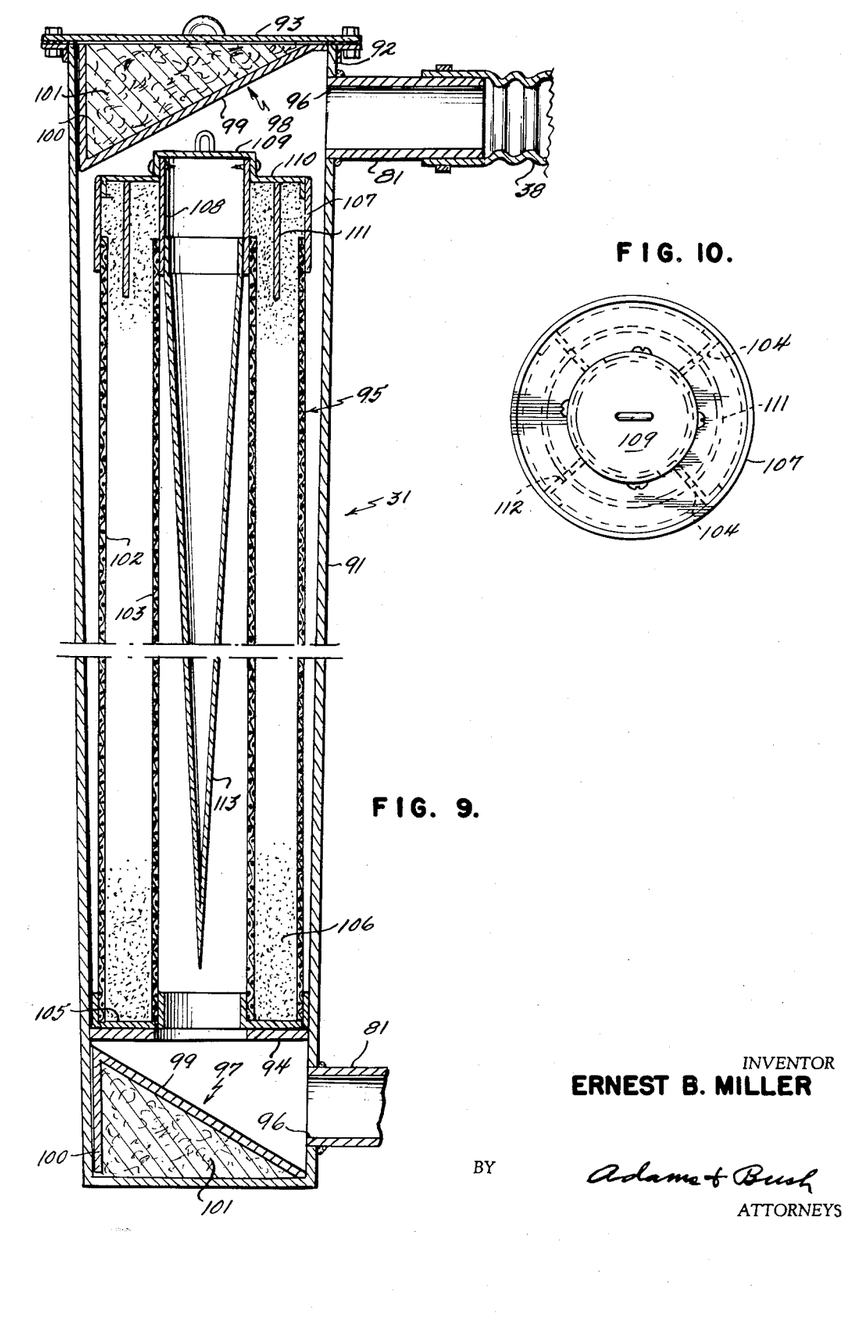
Fig. 9 is a vertical sectional view, with parts broken away, of the fluid treating material containing vessels shown in Fig. 3, showing the containers for holding the treating material mounted therein.
Fig. 10 is a plan view of the container shown in Fig. 9.

The upper and lower flexible pipes 38, 39, which connect the upper and lower end portions of the fluid treating material containing vessels 31 to the upper and lower distributive assemblages are identical in construction and, as shown in Figs. 3 and 9, each comprises a thin walled cylindrical metal tube having the greater portion of its wall formed in a sinuous shape to give it flexibility, the outer cylindrical end of each tube is detachably secured to a nozzle 81 formed on the upper (lower) end portion of the vessel 31, as by strapping. The cylindrical inner end of the tube is provided with an integral flange 82. The opening in the cylindrical inner end of the tube is aligned with one of the circular openings 74 formed in the upper (lower) tube sheet disc valve 35 and the flange 82 is detachably secured to the outer surface of the disc valve, as by countersunk bolts, so that the inner surface of the disc wall will be smooth and uninterrupted (see Fig. 3).

To prevent the escape of gas between the rotating tube sheet disc valve 35 and the manifolds in the member 34, sealing ring gaskets 83 are placed at the juncture of the side walls of the member 34 and the disc valve 35. The ring gaskets 83 are wedged into annular troughs 84, secured, as by welding, to the outer surface of the side walls of the member 34. Each trough comprises an annular top (bottom) wall 85 and an annular side wall 86. The ring gaskets 83, preferably and as shown, comprise a plurality of annular strips of packing, generally rectangular in cross section and made of any suitable material, such as teflon or silica impregnated asbestos.

The four manifolds "a," "b," "c" and "d" are sealed off from each other by means of cross seals 87, each sealed into a recess 88 formed by the adjacent end walls of the manifolds and a bottom plate 89 vertically spaced from the open end of the annular trough in which the manifolds are formed (see Figs. 7 and 8). Each cross seal is tightly wedged in its recess with its outer ends in tight engagement with the adjacent side walls of the annular seals 83 and with its bottom surface in sealing engagement with the upper (lower) surface of the tube sheet disc. In order for the outer ends of the cross seals to engage the adjacent side walls of the annular seals 83, the portions of the side walls 71 and 72 of the member 34 which extend between each pair of adjacent transverse members 73 are cut away, as indicated at 90, for a distance equal to the thickness of the seals 83 (see Fig. 8).

The widths of the manifolds "a," "b," "c" and "d" are substantially the same as the internal diameters of the circular openings 74 in the tube sheet disc 35, so that each cross seal can effectively seal off one of the openings.

Each of the openings 74 formed in the upper tube sheet disc 35 is in vertical alignment with a corresponding one of the openings 74 formed in the lower tube sheet disc 35 and each of the cross seals 87 which separate the manifolds "a," "b," "c" and "d" formed in the upper stationary member 34 is in vertical alignment with a corresponding one of the cross seals 87 which separate the manifolds "a," "b," "c" and "d" formed in the lower stationary member 34.

When the rotary disc valves 35 are stationary, the foregoing arrangement, in effect, divides the fluid treating material containing vessels 31 into four groups or stages, with one group connected to communicate with the manifold "a," one group connected to communicate with the manifold "b," one group connected to communicate with the manifold "c," and one group connected to communicate with the manifold "d," so that four, separate, distinct and continuous flows of fluid may pass through the apparatus. Each flow enters the upper distributive assemblage by means of one of the inlet-outlet conduits 40, 41, 42 or 43, then passes through one of the groups or stages of vessels 31 into the lower distributive assemblage and out through one of the inlet-outlet conduits 44, 45, 46 or 47. As the upper and lower disc valves rotate, each of the flows of fluid will successively pass through the vessels 31.

The fluid treating material containing vessels 31 are identical in construction and, as shown in Figs. 9 and 10, each comprises an elongated hollow tubular member 91 having a closed bottom end and an open upper end provided with a flanged collar 92 to which is secured, as by bolting, a removable cover plate 93.

A horizontally disposed annular disc 94 is mounted in the lower end portion of the member 91 and secured therein, as by welding, to form a gas-tight joint between the outer peripheral edge of the disc and the side wall of the member 91. The lower annular disc 94 forms a support for an elongated annular fluid treating material container 95. The container 95 is removably mounted within the member 91, with its bottom end resting on the annular disc 94 and with the longitudinal open end of the container aligned with the opening in the disc.

The tubular member 91 has a tapered side wall for a purpose hereinafter to be described and is provided with upper and lower circular openings 96 in which are secured, as by welding, the nozzles 81 to which the upper and lower flexible pipes 38 and 39 are secured.

A baffle member 97 is mounted in the space between the bottom of the member 91 and the annular disc 94, and an upper baffle member 98 is secured to the underside of the lower plate 93 and is removable therewith. The upper and lower baffle members 97 and 98 are identical in construction and, as shown in Fig. 9, each comprises a generally elliptical-shaped flat sheet 99 extending upwardly (downwardly) from the bottom (top) of the member 91 to insure an even flow of fluid through the member 91; a side wall forming member 100; and insulating material 101 placed within the pocket formed by the members 99 and 100 and the bottom (top) wall of the member 91 (see Fig. 9).

The containers 95 are identical in construction and, as shown in Figs. 9 and 10, each comprises two concentric tubular screens 102, 103, held in spaced-apart relation by a plurality of longitudinal radial fins 104, with the annular space between the screens closed at the bottom, as by a flanged annular plate 105. The mesh of the screens is such as to retain a granular fluid treating material 106 in the annular space between the screens. In the instant case, the fluid treating material may be of any adsorbent having characteristics substantially like silica gel or the gel of other activated hydrous oxides. Preferably, silica gel is used.

Each of the containers 95 is closed at its top by means of concentric hoops or metal bands 107, 108 mounted on the concentric screens 102, 103, and a cover plate 109 detachably connected to the inner hoop or band 108, as by screws, and having a depending annular flange 110 fitting between the hoops or bands 107, 108. A depending cylindrical fin 111 is secured to the flange 110 and projects downwardly between and below the hoops or bands 107, 108, and fits in slits 112 formed in the upper ends of the radial fins 104, all as shown in Figs. 9 and 10. The construction is such that, as the silica gel settles down, leaving a space between the top portion of the wire screens devoid of silica gel, the fins 111 will prevent fluid from passing through the space.

Mounted within the inner wire screen 103 is an inverted substantially conically shaped baffle member 113. The baffle member 113 is closed at its apex which extends downwardly to a point near the bottom of the container and has its upper peripheral edge suitably secured to the band 108, as by welding. Preferably, the baffle member 113 is made of thin sheet metal.

When the container 95 is mounted within the hollow member 91, as shown in Fig. 9, the elongated annular space between the walls of the member 91 and the inverted conical baffle member 113 forms an elongated frusto-conically shaped duct which is annular in cross section. The annular container, filled with silica gel, is positioned in the duct between the members 91 and 113 in such manner that it forms a barrier extending longitudinally across the duct from top to bottom. The cross sectional areas of the duct at its top and bottom are substantially equal and the tapers of its side walls are such that a substantially uniform velocity is obtained on both sides of the barrier as fluid is transferred from the upstream to the downstream side, regardless of the direction of flow, thereby creating a substantially constant static head over the face of the barrier, resulting in a substantially uniform distribution of the fluid throughout the entire barrier area. Thus, it will be seen that by using the members 91 and 113 as baffle members, the entire area is made use of with resultant increase in efficiency, capacity and economy.

Means may be provided so that the containers 95 which hold the fluid treating material may readily be removed from and replaced in the vessels 31. As shown, such means may comprise an opening 114 formed in the top of the vessel 20 having a cylindrical member 115 welded therein and provided with a readily removable closure disc 116 secured in the upper end of the member 115, as by means of a split shear ring 117 bolted thereto and fitted into a circumferential recess 118 formed in the inner surface of the member 115, and an O-ring packing 119 mounted between the closure disc 116 and the side wall of the member 115 to insure gas tightness.

Figure 11:
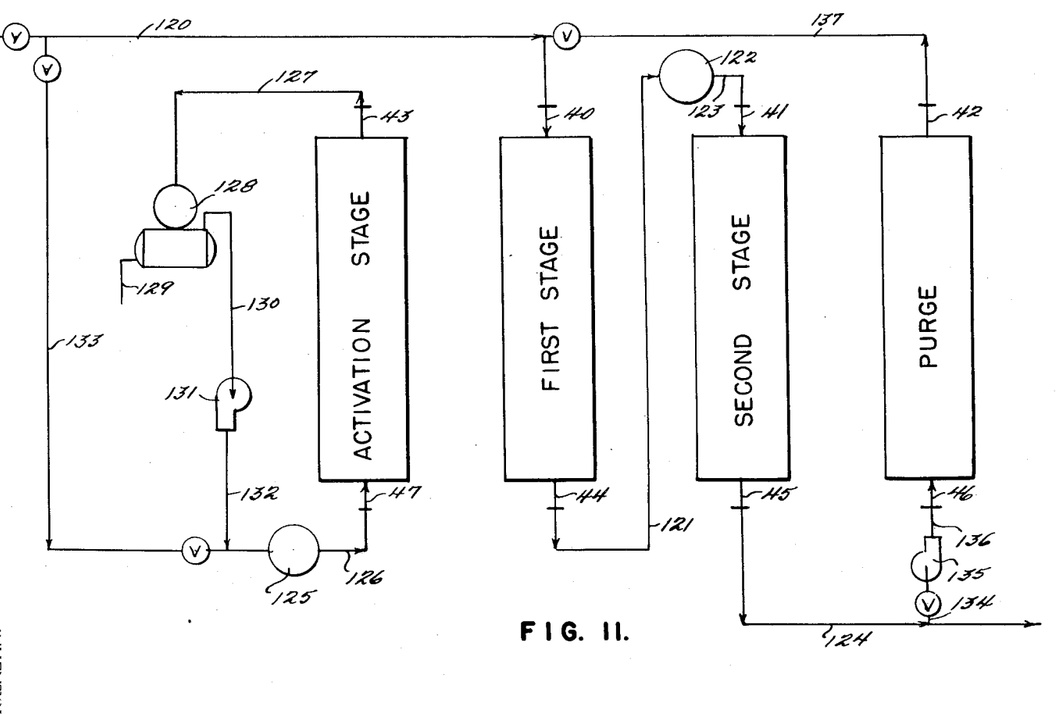
Fig. 11 is a schematic view showing the course of the fluid being treated.

The manner in which the apparatus of the present invention may be employed to remove water vapor and condensable hydrocarbons from wet natural gas, as well as the auxiliary apparatus required, is schematically shown in Fig. 11.

As there shown, the wet natural gas from which moisture and condensable hydrocarbons are to be removed, is supplied under high pressure by pipe line 120 and enters manifold "a" of the upper distributive assemblage through inlet-outlet conduit 40. From manifold "a" the gas passes through openings 74 formed in the upper tube sheet disc valve 35 and flexible pipes 38 into the upper end portion of the group of vessels 31 which are at that time in communication with manifold "a." The gas passes down through the silica gel beds therein into the bottoms of the vessels. The baffle members 113, in cooperation with the tapered side walls of the vessels 31, insure a substantially uniform flow and distribution of the wet gas through the silica gel beds, which adsorb some of the moisture content from the gas. From the bottoms of the vessels 31, the now partially dried gas passes through outlet pipes 39 and openings 74 in the lower tube sheet disc valve 35 into the manifold "a" of the lower distributive assemblage. From the lower manifold "a" the gas passes through inlet-outlet conduit 44 and pipe line 121 into an intercooler 122, where it is cooled. The intercooler may be of the water circulating type. From the intercooler, the gas passes through pipe line 123 and inlet-outlet conduit 41 into manifold "b" of the upper distributive assemblage. From the manifold "b" the gas passes through openings 74 in the tube sheet disc valve 35 and inlet pipe 38 into the upper end portion of the group of vessels 31 which are at that time in communication with manifold "b." The gas passes downwardly through the vessels 31 of the second group and through the silica gel beds therein into the bottom thereof. The remaining moisture content of the gas being adsorbed during its passage through the silica gel beds.

From the bottoms of the vessels 31 of the second group, the now dried gas passes through outlet pipes 39 and openings 74 in the lower tube sheet disc valve of the lower distributive assemblage into the lower manifold "b." From the manifold "b" the gas passes through inlet-outlet conduit 45 and pipe line 124 to the various points of use.

The removal and recovery of the moisture and hydrocarbons from the beds of adsorbent material is effected in the third or activation stage. The activation gas, a captive gas, is heated in a heater 125, where its temperature is raised to from 300° F. to 600° F., depending upon the moisture content and the type of hydrocarbons to be removed. From the heater, the heated activation gas passes through pipe line 126 and inlet-outlet conduit 47 into the lower manifold "d" of the lower distributive assemblage. From the manifold "d" the hot activation gas passes through openings 74 in the lower tube sheet disc valve 35 and flexible pipes 39 into the lower end portions of the groups of vessels 31 which are at that time in communication with manifold "d." The gas passes upwardly through the vessels 31 of the third group and through the silica gel beds therein into the tops thereof. As the hot gas passes through the adsorbent material it removes the moisture and hydrocarbons therefrom. From the tops of the vessels 31 the hot, moisture-hydrocarbon laden gas passes through flexible pipes 38 and openings 74 in the upper tube sheet disc valve 35 into the upper manifold "d." From the upper manifold "d," the hot gas passes through inlet-outlet conduit 43 and pipe line 127 into a condenser-separator 128, where the moisture and condensable hydrocarbons are condensed and separated. The water and hydrocarbons are drained from the bottom of the separator by means of drain line 129.

From the condenser-separator, the now stripped captive gas passes through a pipe line 130 to a fan or blower 131 and is recirculated by the blower through pipe line 132 and the heater 125 back through the activation stage. This recirculation process is continuous.

The captive stream of gas in the activation system is circulated by means of the blower 131, through the heater 125, the activation stage of the apparatus, and the condenser-separator 128. The composition of this stream will build up gradually in terms of condensable vapors, composed chiefly of hydrocarbons, until the dew point of the captive gas stream reaches condenser temperature, and will thereafter yield as liquid all the condensable vapors desorbed in the reactivation stage of the apparatus.

While it is not necessary to provide outside gas for use as the captive activation gas, in order to speed up the initial operation of the apparatus, it may be desirable to do so. Accordingly, gas may be diverted from supply pipe line 120 through a pipe line 133 to the pipe line 132 for initial operation. Pipe line 133 is provided with suitable cut-off valves.

It is sometimes desirable to purge the silica gel beds after they have passed through the activation stage and this is accomplished in the fourth or purging stage.

While any suitable gas may be used as the purging medium, preferably, and as shown, the gas used for purging is provided by diverting a portion of the effluent dry natural gas from the last dehydration stage of the apparatus through pipe line 134, fan or blower 135, pipe line 136 and inlet-outlet orifice 46 into the lower manifold "c" of the lower distributive assemblage. From the manifold "c" the purging gas passes through openings 74 in the lower tube sheet disc valve 35 and flexible pipes 39 into the lower end portions of the group of vessels which are at that time in communication with manifold "c." The gas passes upwardly through the vessels 31 of the fourth group and through the silica gel beds therein into the tops thereof. As the purging gas passes through the adsorbent material it removes any remaining activation gas or deposited vapors therefrom, thereby purging the beds. From the tops of the vessels 31 the purging gas passes through flexible pipes 38 and openings 74 in the upper tube sheet disc valve 35 into the upper manifold "c." From the upper manifold "c" the purging gas passes through inlet-outlet conduit 42 and pipe line 137 back into the flow of the wet gas being treated, preferably on the way to the first dehydration stage. The pipe lines 134 and 137 are provided with suitable cut-off valves to permit the apparatus to be operated with the purging stage cut out.

The gas being dehydrated makes two passages through the groups of the silica gel containing vessels, while the heated gas or reactivating medium and the purging medium each make a single passage through a group of the silica gel containing vessels. For convenience of description, the vessels which form the group through which the first dehydration passage is made is called the first dehydration stage, the group through which the second dehydrating passage is made is called the second dehydration stage, the group through which the hot gas used for reactivation passes is called the reaction stage, and the group through which the purging medium passes is called the purging stage. Also, the pressure vessels are called zones in which either dehydration, reactivation, or purging takes plate, depending upon the particular fluid flowing therethrough at a given time.

Figure 1:
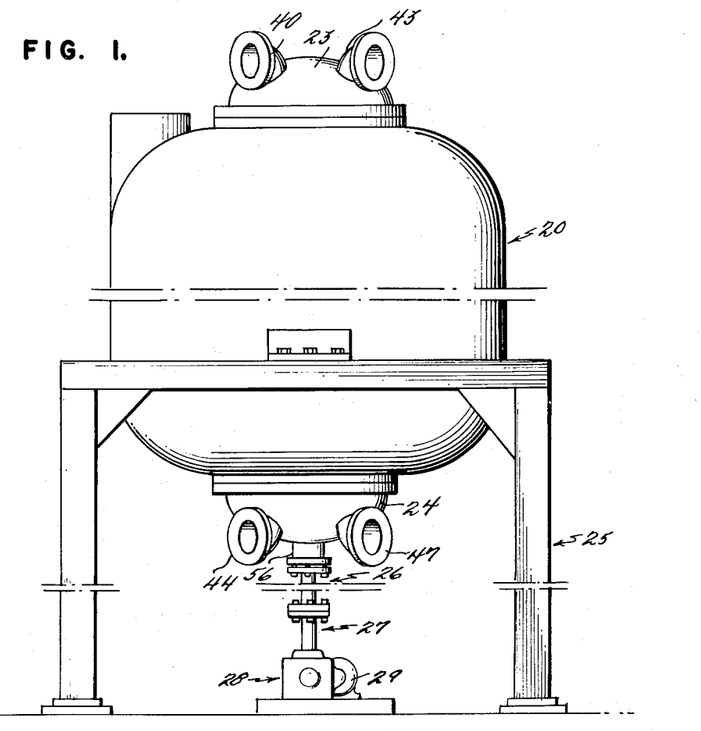
Fig. 1 is a side elevational view of one embodiment of fluid treating apparatus constructed in accordance with the present invention.
Figure 2:
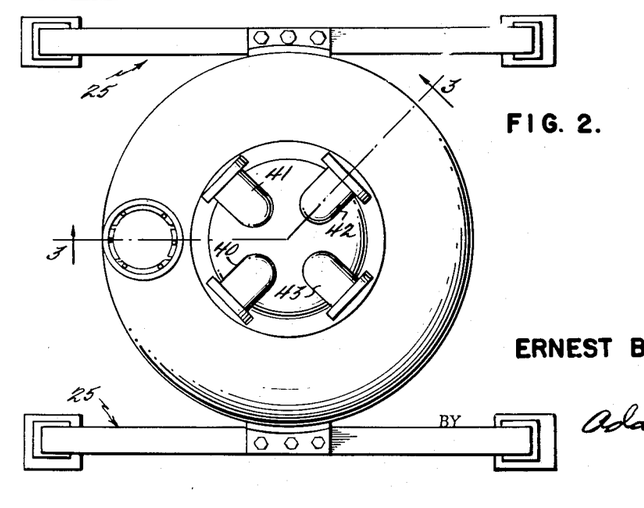
Fig. 2 is a plan view of the apparatus shown in Fig. 1.

In the particular embodiment of the invention illustrated, the valve discs 35 are rotated counterclockwise, as viewed in Fig. 2, and at the rate of 1 revolution every 10 minutes; thus, it will be seen that, as the valves rotate, each of the vessels 31 will be successively brought into communication with the manifolds "d," "c," "b" and "a" in the upper and lower distributive assemblages, so that each vessel 31 will, in turn, become an activation zone, a purging zone, a second dehydration zone, and a first dehydration zone.

From the foregoing, it readily will be seen that there has been provided novel apparatus for treating fluids, either liquid or gaseous; one that is particularly adapted to treat such fluids while under high pressure; and one which provides for one or more passages of the fluid being treated through the apparatus.

While the flows of fluid through the apparatus have been described as entering the top distributive assemblage and flowing downward to and out of the bottom distributive assemblage, obviously, the flows may be in either direction.

Obviously, too, the present invention is not restricted to the particular embodiment thereof herein shown and described. Moreover, it is not indispensable that all of the features of the invention be used conjointly, since they may be advantageously employed in various combinations and sub-combinations.

What is claimed is:

1. Apparatus for treating fluids comprising a pair of vertically spaced and aligned distributive assemblages, the upper of the assemblages including a stationary annular trough-shaped member having an open bottom, a plurality of seals mounted within the annular member dividing it into a plurality of arc-shaped manifolds having open bottoms, a rotatable disc valve slidably engaging the open bottom of said annular member and provided with a circular row of openings positioned to communicate with the respective manifolds as the valve rotates, and a plurality of inlet-outlet conduits, each connected to one of said manifolds to permit separate flows of fluid through the distributive assemblage, the lower of said assemblages including a stationary annular trough-shaped member having an open top, a plurality of seals mounted within the annular member dividing it into a plurality of arc-shaped manifolds, a rotatable disc valve slidably engaging the open top of said annular member and provided with a circular row of openings positioned to communicate with the respective manifolds as the valve rotates, and a plurality of inlet-outlet conduits each connected to one of the manifolds to permit separate flows of fluid through the distributive assemblage; a plurality of elongated upright closed vessels adapted to contain fluid treating material mounted in a row extending around and spaced radially outward from said distributive assemblages; a group of pipes each connecting the upper end portion of one of said closed vessels to one of the openings in the disc valve in the upper distributive assemblage; a second group of pipes, each connecting the lower end portion of one of said closed vessels to one of the openings in the disc valve of the lower distributive assemblage; and means for rotating said closed vessels and the disc valves in said distributive assemblages about a common vertical axis so that the separate flows of fluid through said distributive assemblages will be directed successively through the vessels adapted to contain fluid treating material.

2. Apparatus for treating fluids comprising a pair of vertically spaced and aligned stationary annular trough-shaped members, the upper of said annular members having an open bottom and carrying seals therein dividing the member into a plurality of arc-shaped manifolds with each manifold having a conduit connected thereto for the passage of fluids, the lower of said annular members having an open top and carrying seals therein dividing the member into a plurality of arc-shaped manifolds with each manifold having a conduit connected thereto for the passage of fluids; a vertical rotatable shaft extending between said annular members; a pair of tube sheet disc valves mounted on said shaft for rotation therewith, each positioned to slidably engage the open end of one of said annular members and provided with a circular row of openings positioned to communicate with the manifolds therein as the valve rotates; a plurality of elongated upright closed vessels adapted to contain fluid treating material encircling said shaft and spaced radially outward from said trough-shaped members and carried by support means fixedly attached to said shaft so that said vessels will rotate about the longitudinal axis of said shaft as it rotates; a plurality of pipes each connecting one end portion of one of said closed vessels to one of the openings in one of said tube sheet disc valves; a second group of pipes each connecting the other end portions of one of said closed vessels to one of the openings in the other of said tube sheet disc valves; and means for rotating said shaft, said closed vessels and said tube sheet disc valves so that separate and distinct flows of fluid will be directed successively through said closed vessels containing fluid treating material.

3. Apparatus as set forth in claim 1, wherein each of said closed vessels is provided with a removable cover plate and wherein an elongated annular foraminous container adapted to hold fluid treating material is removably mounted in each of said closed vessels.

4. Apparatus as set forth in claim 3, wherein said closed vessels and said distributive assemblages are mounted within a pressure vessel so that all of the flows of fluid through the apparatus may be made under high pressure.

5. Apparatus as set forth in claim 4, wherein said pressure vessel is provided with an opening having a removable cover plate, said opening being positioned to permit the ready removal of the foraminous containers from the closed vessel as they are successively brought under the opening.

6. Apparatus as set forth in claim 2, wherein each of said tube sheet disc valves is mounted on said shaft so as to have longitudinal movement thereon and wherein resilient means are provided normally urging each of said tube sheet disc valves into sliding engagement with the open end of the annular shaped member with which it is associated.

References Cited in the file of this patent

UNITED STATES PATENTS

| | | |
|---|---|---|
| 1,965,461 | Gray | July 3, 1934 |
| 2,355,024 | Yerrick et al. | Aug. 1, 1944 |
| 2,507,538 | Miller | May 16, 1950 |
| 2,507,608 | Miller | May 16, 1950 |
| 2,549,583 | Eckersley | Apr. 17, 1951 |